United States Patent
Wang et al.

(10) Patent No.: US 9,328,714 B2
(45) Date of Patent: May 3, 2016

(54) HYDROELECTRIC POWER GENERATING APPARATUS WITHOUT DAM

(71) Applicant: SHANDONG ZHONGTAI NEW ENERGY GROUP CO., LTD, Jinan, Shandong Province (CN)

(72) Inventors: Jingfu Wang, Jinan (CN); Lijun Wang, Jinan (CN); Wenjun Wang, Jinan (CN)

(73) Assignee: SHANDONG ZHONGTAI NEW ENERGY GROUP CO., LTD., Jinan (CN)

( * ) Notice: Subject to any disclaimer, the term of this patent is extended or adjusted under 35 U.S.C. 154(b) by 0 days.

(21) Appl. No.: 14/365,019

(22) PCT Filed: Sep. 24, 2012

(86) PCT No.: PCT/CN2012/081819
§ 371 (c)(1),
(2) Date: Jun. 12, 2014

(87) PCT Pub. No.: WO2013/086876
PCT Pub. Date: Jun. 20, 2013

(65) Prior Publication Data
US 2014/0333071 A1    Nov. 13, 2014

(30) Foreign Application Priority Data

Dec. 12, 2011    (CN) .......................... 2011 1 0410847

(51) Int. Cl.
*F03B 13/00* (2006.01)
*H02P 9/04* (2006.01)
(Continued)

(52) U.S. Cl.
CPC . *F03B 13/10* (2013.01); *F03B 3/12* (2013.01); *F03B 17/065* (2013.01); *F05B 2240/97* (2013.01); *Y02E 10/28* (2013.01)

(58) Field of Classification Search
USPC ...................................................... 290/54, 55
See application file for complete search history.

(56) References Cited

U.S. PATENT DOCUMENTS

| | | | | |
|---|---|---|---|---|
| 110,683 | A | * | 1/1871 | Savoral .................. F01D 17/18 415/155 |
| 505,736 | A | * | 9/1893 | Walker .................... F03D 3/067 416/197 A |

(Continued)

FOREIGN PATENT DOCUMENTS

| CN | 2886113 Y | 4/2007 |
|---|---|---|
| CN | 101135289 A | 3/2008 |

(Continued)

OTHER PUBLICATIONS

English Translation of the International Search Report for corresponding PCT Application No. PCT/CN2012/081819, filed Sep. 24, 2012, dated Jan. 3, 2013, 4 pages.

*Primary Examiner* — Pedro J Cuevas
(74) *Attorney, Agent, or Firm* — Knobbe Martens Olson & Bear LLP

(57) ABSTRACT

Various examples provide a large scale hydroelectric power generating apparatus without dam, which includes a base and a turbine frame mounted on the base; a turbine shaft mounted within the turbine frame, connected to at least one generator, a first support assembly and a second support assembly mounted within the turbine frame for fixing the turbine shaft; hydraulic mechanisms having at least one layer of vanes mounted on the turbine shaft, each of the hydraulic mechanisms including a vane frame, multiple vane shafts mounted within the vane frame, and multiple vanes with the vane shafts as rotating axis; and vane stoppers mounted on the vane frame or on the vane shafts for controlling an opening angle of each of the vanes.

10 Claims, 4 Drawing Sheets

(51) Int. Cl.
 *F03B 13/10* (2006.01)
 *F03B 17/06* (2006.01)
 *F03B 3/12* (2006.01)
 *F03D 9/00* (2006.01)

(56) References Cited

U.S. PATENT DOCUMENTS

| | | | | |
|---|---|---|---|---|
| 662,737 A * | 11/1900 | Puszkar | | 416/118 |
| 921,940 A * | 5/1909 | Atkinson | | F04D 29/247 415/141 |
| 1,046,026 A * | 12/1912 | Salisbury | | F03D 5/04 416/119 |
| 1,076,713 A * | 10/1913 | Southwick | | F03D 3/067 416/119 |
| 1,536,968 A * | 5/1925 | Palm | | F03D 3/067 416/118 |
| 1,649,644 A * | 11/1927 | Alexeeff | | F03D 3/0454 415/141 |
| 1,794,930 A * | 3/1931 | Spencer | | F03D 7/06 416/118 |
| 3,442,492 A * | 5/1969 | Sullivan | | F03D 3/067 416/118 |
| 3,920,354 A * | 11/1975 | Decker | | F03D 3/067 416/117 |
| 3,995,170 A * | 11/1976 | Graybill | | F03D 3/067 290/44 |
| 4,045,148 A * | 8/1977 | Morin | | F03B 17/065 415/7 |
| 4,047,833 A * | 9/1977 | Decker | | F03D 3/0409 290/55 |
| 4,048,947 A * | 9/1977 | Sicard | | F03B 17/065 180/2.2 |
| 4,115,027 A * | 9/1978 | Thomas | | F03D 3/0409 126/247 |
| 4,118,637 A * | 10/1978 | Tackett | | F03D 7/06 290/55 |
| 4,134,710 A * | 1/1979 | Atherton | | F03B 17/065 290/53 |
| 4,253,800 A * | 3/1981 | Segawa | | F01D 5/10 415/119 |
| 4,303,835 A * | 12/1981 | Bair | | F03D 3/068 290/44 |
| 4,346,305 A * | 8/1982 | White | | F03B 17/065 290/55 |
| 4,365,935 A * | 12/1982 | Zukeran | | F03D 7/06 416/117 |
| 4,468,169 A * | 8/1984 | Williams | | F03D 3/067 416/119 |
| 4,496,283 A * | 1/1985 | Kodric | | F03D 3/067 416/119 |
| 4,534,703 A * | 8/1985 | Flavell | | F03D 3/068 416/119 |
| 4,649,284 A * | 3/1987 | Hsech-Pen | | F03D 7/06 290/55 |
| 4,679,985 A * | 7/1987 | Worms | | F03B 17/065 416/119 |
| 4,684,817 A * | 8/1987 | Goldwater | | F03D 3/067 290/55 |
| 5,131,805 A * | 7/1992 | Stevenson | | F03D 3/061 415/1 |
| 5,193,978 A * | 3/1993 | Gutierrez | | F03D 3/067 416/119 |
| 5,855,470 A * | 1/1999 | Holmes | | F03D 3/068 415/124.1 |
| 5,882,143 A * | 3/1999 | Williams, Jr. | | E02B 9/00 290/53 |
| 6,069,409 A * | 5/2000 | Fowler | | F03D 3/002 290/44 |
| 6,179,563 B1 * | 1/2001 | Minchey | | F03D 3/067 415/4.2 |
| 6,688,842 B2 * | 2/2004 | Boatner | | F03D 3/067 415/4.2 |
| 6,734,576 B2 * | 5/2004 | Pacheco | | B60K 16/00 290/53 |
| 6,857,846 B2 * | 2/2005 | Miller | | F03D 3/02 415/18 |
| 7,077,628 B1 * | 7/2006 | Acord | | F03D 3/067 415/4.2 |
| 7,258,527 B2 * | 8/2007 | Shih | | B63H 9/00 415/4.2 |
| 7,918,648 B1 * | 4/2011 | Simnacher | | F03D 3/067 416/111 |
| 8,016,544 B1 * | 9/2011 | Nguyen | | F03D 3/067 415/130 |
| 8,087,894 B2 * | 1/2012 | Brooks | | F03D 3/0409 290/55 |
| 8,120,196 B1 * | 2/2012 | Neese | | F03B 13/183 290/53 |
| 8,232,664 B2 * | 7/2012 | Stroup | | F03D 3/0418 290/44 |
| 8,585,364 B2 * | 11/2013 | Kosch | | F03D 3/067 416/12 |
| 8,657,560 B2 * | 2/2014 | Grenier | | F03D 3/061 415/4.2 |
| 8,829,704 B2 * | 9/2014 | Grigg | | F03D 3/002 290/44 |
| 8,847,423 B2 * | 9/2014 | Wang | | F03D 3/067 290/43 |
| 8,899,925 B2 * | 12/2014 | Tamatsu | | F03B 17/065 416/119 |
| 2009/0001730 A1 * | 1/2009 | Kuo | | F03D 3/02 290/55 |
| 2009/0115194 A1 * | 5/2009 | Lin | | F03D 3/005 290/55 |
| 2011/0181047 A1 * | 7/2011 | Dulcetti Filho | | F03D 3/02 290/55 |
| 2012/0292916 A1 * | 11/2012 | Wang | | F03D 3/067 290/55 |
| 2015/0369216 A1 * | 12/2015 | Kisovec | | F03D 3/068 290/44 |

FOREIGN PATENT DOCUMENTS

| | | |
|---|---|---|
| CN | 201574871 U | 9/2010 |
| CN | 102086833 A | 6/2011 |
| CN | 102493909 A | 6/2012 |
| EP | 1 712 785 A2 | 10/2006 |
| FR | 2 913 070 A1 | 8/2008 |
| WO | WO 2013/086876 A1 | 6/2013 |

* cited by examiner

HYDROELECTRIC POWER GENERATING APPARATUS WITHOUT DAM

TECHNICAL FIELD

The present disclosure relates to hydroelectric power generation techniques, and particularly, to a hydroelectric power generating apparatus without dam.

BACKGROUND

It is generally expensive, time-consuming, and difficult to construct hydraulic structures that can form a water drop and regulate the water flow, such as dams, water pipe culverts, etc. Those difficulties make it impossible to fully use water resources in some rivers that have strong currents, steep beaches or a lot of gorges and gaps. Moreover, hydro plants, e.g., dams, can cause damages to ecology and environment of surrounding areas.

SUMMARY

In order to address at least some of the problems of conventional hydro plants, such as high cost, long construction time and etc., various examples of the present disclosure provide a large-scale hydroelectric power generating apparatus without dam that is inexpensive and less time-consuming in construction.

According to various examples of the present disclosure, a hydroelectric power generating apparatus without dam may include a concrete base mounted at the bottom of a waterway, a turbine frame fixed in the concrete base, an upper support assembly and a lower support assembly that are respectively provided at the center of the concrete base and the turbine frame for supporting a turbine shaft. Plural hydraulic mechanisms are disposed symmetrically at the lower portion of the turbine shaft, and are perpendicular to the turbine shaft. Each of the hydraulic mechanisms 8 is composed of at least one layer of vanes. The upper portion of the turbine shaft is connected to a driven gear of a gearbox via a driving gear. Generators are mounted on a beam of the turbine frame. Each of the generators is connected to a clutch. The clutch is connected to a power-output shaft of the gearbox. A braking mechanism is provided on the beam for controlling the rotation speed of the turbine shaft. Each of the hydraulic mechanisms may include a vane frame, a vane shaft mounted within the vane frame, a vane, and a vane stopper for restricting the opening angle of the vane. The vane shaft is mounted within the vane frame in such a manner that the two portions of the vane on both sides of the vane shaft are unequal. The vane stopper is mounted on the vane frame or on the vane shaft. The vane is arc-shaped. Alternatively, the braking mechanism may be mounted on a lower beam below the above mentioned beam.

Compared with conventional mechanisms, the hydroelectric power generating apparatus generates hydroelectric power by using the kinetic energy of natural water flow, and there is no need to build dams or water pipe culverts. Thus, the hydroelectric power generating apparatus is low in cost and fast to be built. Further, the hydroelectric power generating apparatus can be deployed in waterways having strong currents or a lot of gorges and gaps, or on steep beaches, thus can make full use of hydropower resources while make no damage to ecology and environment of surrounding areas.

Furthermore, the vanes in the hydraulic mechanisms are arc shaped, and are mounted in vane frames via vane shafts in such a manner that two parts of each vane on both sides of the vane shaft are unequal. There are vane stoppers for controlling the opening angle of the vanes. When a vane moves in the direction of the water flow, the area of the vane that bears the water propelling force reaches a maximum value under the impact of the vane stopper. Therefore, the hydraulic mechanisms can be propelled to generate power when flow velocity reaches 3 m/s. When a vane moves against the direction of the water flow, the vane swings under the pressure of the water flow to open an outlet for water. As such, water resistance of the turbine is reduces, power usage efficiency is increased, and the turbine is more durable.

Figure 1:
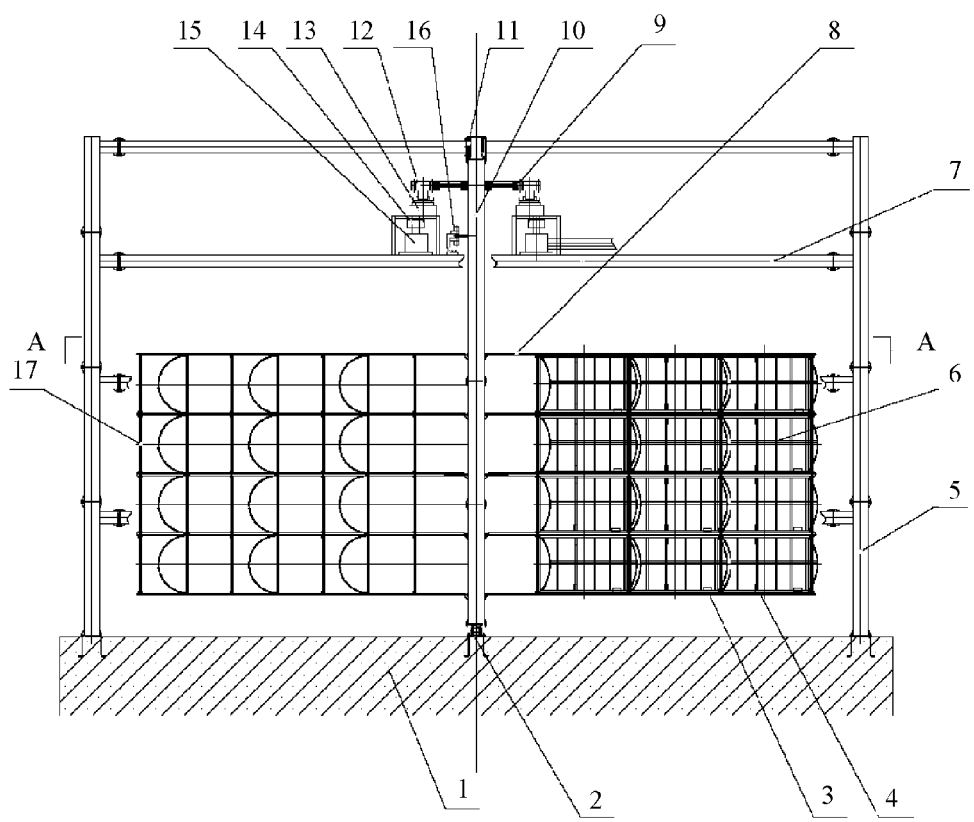
FIG. 1 is a schematic diagram illustrating a structure of a hydroelectric power generating apparatus in accordance with an example of the present disclosure.

In the drawings: 1. concrete base, 2. lower support assembly, 3. vane shaft, 4. vane stopper, 5. turbine frame, 6. vane, 7. beam, 8. hydraulic mechanism, 9. driving gear, 10. turbine shaft, 11. upper support assembly, 12. driven gear, 13. gearbox, 14. clutch, 15. generator, 16. braking mechanism, 17. vane frame, 18. lower beam.

DETAILED DESCRIPTIONS

For simplicity and illustrative purposes, the present disclosure is described by referring mainly to some examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

According to an example, a hydroelectric power generating apparatus includes a base and a turbine frame fixed in the base. The base may be mounted on a beach or at the bottom of a waterway. A turbine shaft is mounted in the turbine frame. A first support assembly and a second support assembly are provided in the turbine frame for supporting the turbine shaft. Hydraulic mechanisms are disposed symmetrically on the turbine shaft, and are perpendicular to the turbine shaft. Each of the hydraulic mechanisms has at least one layer of vanes. The turbine shaft is connected with at least one generator. The generator may be mounted on a beam of the turbine frame. The beam is perpendicular to the turbine shaft.

In an example, each hydraulic mechanism includes a vane frame mounted on the turbine frame, a vane shaft installed in the vane frame, and a vane. A vane stopper may be mounted on the vane frame or the vane shaft for controlling the opening angle of the vane.

In an example, the cross-section of the vane is arc shaped.

In an example, the turbine shaft may be connected to a driven gear of a gearbox via a driving gear. A power output gear of the gearbox is connected to a clutch which is connected to the generator.

In an example, a braking mechanism is mounted on the beam for restricting the rotation speed of the turbine shaft.

In an example, areas of the vane on both sides of the vane shaft are unequal.

In an example, the braking mechanism may be mounted on another beam that is in a different position.

In an example, the turbine shaft is connected to one or multiple generators, e.g., four or more, via one or multiple clutches.

In an example, the turbine shaft may be connected to multiple generators via one or multiple driving gears to produce hydroelectric power. The driving gears and the generators may be arranged into plural layers, and each layer may include a driving gear and one or multiple generators.

In an example, multiple driving gears may be mounted on the turbine shaft. In the turbine frame, there may be multiple layers of beams, and at least one layer of the multiple layers may have multiple generators mounted. The multiple generators mounted on a beam may be connected to one of the driving gears. For example, a driving gear may be connected to at least one generator mounted on a beam, and another driving gear may be connected to at least one generator mounted on another beam. The total number of generators may be determined based on the gross power generation capacity.

In an example, a driving gear may be connected to an input gear of a generator, e.g., the driving gear may drive the input gear of the generator by gear engagement to generate power.

Several examples are hereinafter described in detail.

As shown in FIG. 1, the hydroelectric power generating apparatus without dam may include a concrete base 1 at the bottom of a waterway, a turbine frame 5 fixed in the concrete base 1, an upper support assembly 11 and a lower support assembly 2 that are respectively provided at the center of the concrete base 1 and the turbine frame 5 for supporting a turbine shaft 10. Hydraulic mechanisms 8 are disposed symmetrically at the lower portion of the turbine shaft 10, and are perpendicular to the turbine shaft 10. Each of the hydraulic mechanisms 8 is composed of four layers of vanes 6. The upper portion of the turbine shaft 10 is connected to a driven gear 12 of a gearbox via a driving gear 9. Four generators 15 of 500 KW are mounted on a beam 7 of the turbine frame 5. Each of the generators 15 is connected to an electronically controlled clutch 14. The clutch 14 is connected to a power-output shaft of the gearbox 13. A braking mechanism 16 is provided on the beam 7 for controlling the rotation speed of the turbine shaft 10.

Each of the hydraulic mechanisms 8 may include a vane frame 17, a vane shaft 3 mounted within the vane frame 17, a vane 6, and a vane stopper 4 for restricting the opening angle of the vane. The vane shaft 3 is mounted within the vane frame 17 in such a manner that the two portions of the vane on both sides of the vane shaft 3 are unequal. The vane stopper 4 is mounted on the vane frame 17 or on the vane shaft 3. The vane 6 may be arc shaped to increase the impact of the water on the vane. In an example, the radian of arc shape of the vane 6 may be 30° to 45°.

Figure 2:
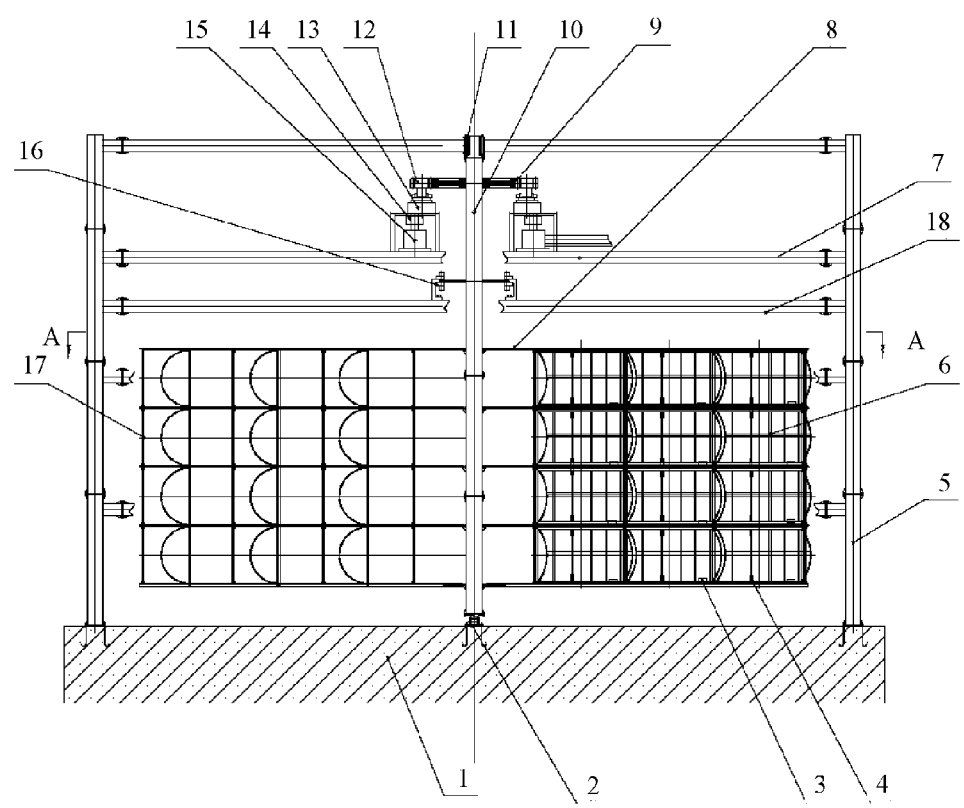
FIG. 2 is a schematic diagram illustrating a structure of a hydroelectric power generating apparatus in accordance with an example of the present disclosure.

As shown in FIG. 2, the braking mechanism 16 for restricting the rotation speed of the turbine shaft 10 may also be mounted on a lower beam 18 below the beam 7.

Figure 3:
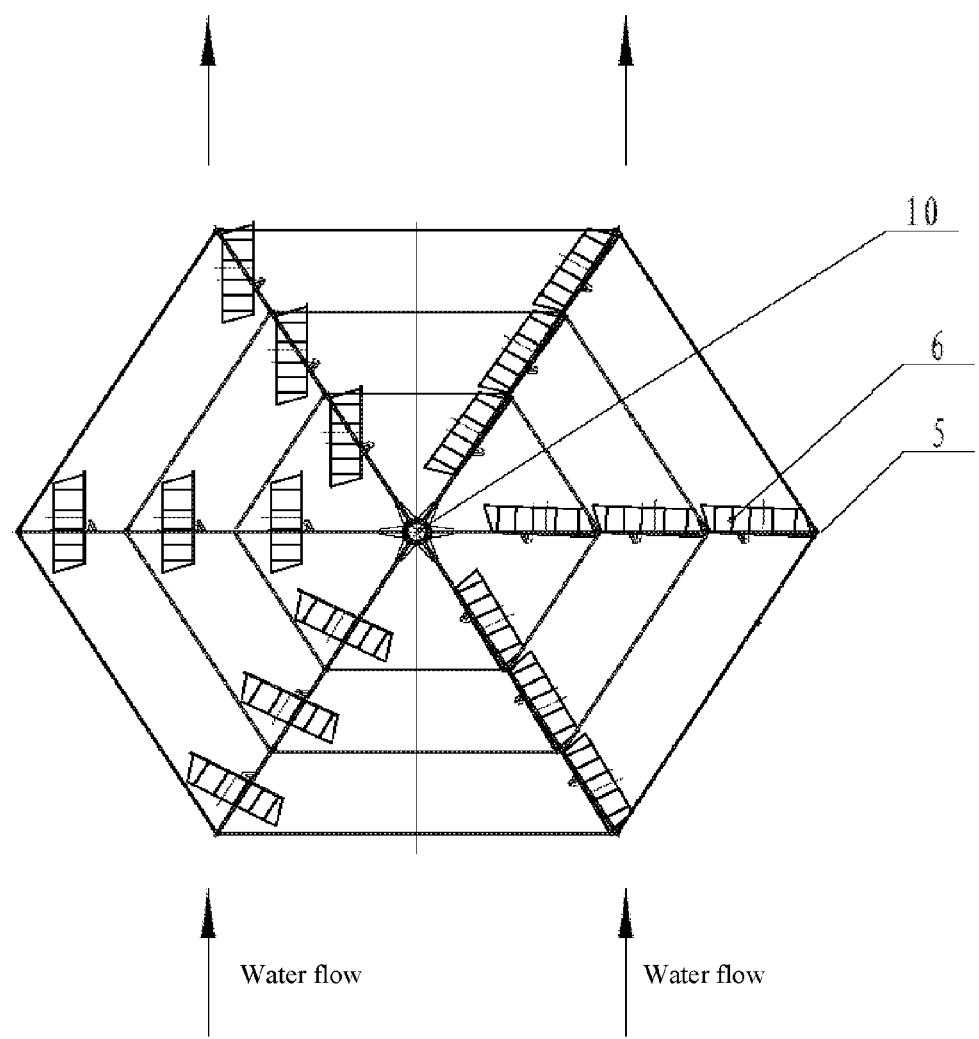
FIG. 3 is a sectional view of FIG. 1 taken through line A-A.
Figure 4:
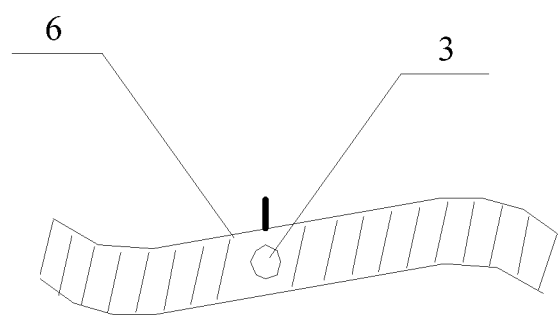
FIG. 4 is a sectional view of a vane which is arc shaped in accordance with an example of the present disclosure.

As shown in FIG. 3, when the vane 6 is propelled by water to rotate, power is conveyed to the turbine shaft 10. The turbine shaft 10 drives the driving gear 9 to rotate. The driven gear 12 of the gearbox 13 receives the torque delivered by the driving gear 9, and drives the gearbox 13. A signal is sent by a rotation speed sensor to a control system which analyzes the signal and issues a connecting instruction to the electronically controlled clutch 14. Then the generator 15 obtains a working torque and generates power. In an example, when water enters the right wing of a hydraulic mechanism 8, the vanes 6 in the right wing are closed. The vanes 6 and vane frames 17 are propelled by the water, and the hydraulic mechanism 8 rotates to generate power. When the previous right wing of the hydraulic mechanism 8 rotates to the left side of the center line, the vanes 6 are pushed open by the water and become parallel to the direction of the water flow to discharge the water. As such, resistance of the hydraulic mechanism 8 is reduced, and the efficiency of power generation is maximized. When a vane 6 and corresponding vane frame 17 rotates to be on the right wing of the hydraulic mechanism 8, the vane closes automatically, and a rotation cycle is finished. As long as the flow velocity reaches 3 m/s, the vane 6 can be propelled to generate power.

Various examples may be applied to waterways having strong currents, steep beaches or a lot of gorges and gaps, e.g., the Yangtze River, Nujiang River, Dadu River, Minjiang River, Lancang River, Jinsha River, Wujiang River, etc. The installed capacity of a single power generator can reach 500 KW to 2 MW. Each hydroelectric power generation station can have a capacity of more than 2 MW to 50 MW.

The foregoing descriptions are only examples of the disclosure and are not for use in limiting the protection scope thereof. Any modification, equivalent replacement and improvement made under the principle of the present invention should be included in the protection scope thereof.

The invention claimed is:

1. A hydroelectric power generating apparatus without dam, comprising:
   a concrete base (1), configured at the bottom of a waterway;
   a turbine frame (5), fixed in the concrete base (1);
   a turbine shaft (10), supported by an upper support assembly (11) and a lower support assembly (2) provided at the center of the concrete base (1) and the turbine frame (5), the upper portion of the turbine shaft (10) is connected to a driven gear (12) of a gearbox via a driving gear (9); and
   hydraulic mechanisms (8), disposed symmetrically at the lower portion of the turbine shaft (10), the hydraulic mechanisms being perpendicular to the turbine shaft (10),
   wherein at least one generator (15) is mounted on a beam (7) of the turbine frame (5), each of the at least one generator (15) is connected to a clutch (14), and the clutch (14) is connected to a power-output shaft of the gearbox (13),
   wherein each of the hydraulic mechanisms (8) is composed of at least one layer of vanes (6), and comprises a vane frame (17) mounted on the turbine shaft (10), a vane shaft (3) mounted within the vane frame (17), and a vane (6),
   and wherein two portions of the vane (6) on both sides of the vane shaft (3) have unequal area.

2. The hydroelectric power generating apparatus without dam of claim 1, wherein each of the hydraulic mechanisms (8) further comprises: a vane stopper (4) for restricting an opening angle of the vane (6), wherein the vane stopper (4) is mounted on the vane frame (17) or on the vane shaft (3).

3. The hydroelectric power generating apparatus without dam of claim 1, wherein a braking mechanism (16) is provided on a lower beam (18) below the beam (7).

4. The hydroelectric power generating apparatus without dam of claim 2, wherein the vane (6) is arc shaped.

5. A hydroelectric power generating apparatus without dam, comprising a base and a turbine frame mounted on the base;

a turbine shaft mounted within the turbine frame, connected to at least one generator, a first support assembly and a second support assembly mounted within the turbine frame for fixing the turbine shaft;

hydraulic mechanisms having at least one layer of vanes mounted on the turbine shaft, each of the hydraulic mechanisms including a vane frame, multiple vane shafts mounted within the vane frame, and multiple vanes with the vane shafts as rotating axis; and vane stoppers mounted on the vane frame or on the vane shafts for controlling an opening angle of each of the vanes, wherein two portions of each of the vanes on both sides of the vane shaft have unequal area.

6. The hydroelectric power generating apparatus without dam of claim 5, wherein a cross section of each of the vanes is arc shaped.

7. The hydroelectric power generating apparatus without dam of claim 5, wherein the turbine shaft is connected to a driven gear of a gearbox via at least one driving gear; a power output gear of the gearbox is connected to a clutch, and the clutch is connected to a generator.

8. The hydroelectric power generating apparatus without dam of claim 5, wherein a generator is mounted on a first beam within the turbine frame; and the apparatus further comprises: a braking mechanism, mounted on a second beam within in the turbine frame, for controlling a rotation speed of the turbine shaft.

9. The hydroelectric power generating apparatus without dam of claim 5, wherein at least two driving gears are mounted on the turbine shaft, the turbine frame includes at least two layers of beams, multiple generators are mounted on each of the beams, and the multiple generates mounted on each beam are connected to one of at least two driving gears.

10. The hydroelectric power generating apparatus without dam of claim 5, wherein at least one driving gear is mounted on the turbine shaft, and is connected to an input gear of at least one generator.

* * * * *